United States Patent [19]

Lohr et al.

[11] 3,779,835

[45] Dec. 18, 1973

[54] BUILDING DRUM

[75] Inventors: Herb R. Lohr, Akron; Toby Magos, Jr., Kent, both of Ohio

[73] Assignee: Akron Standard Division of Eagle-Picher, Industries, Akron, Ohio

[22] Filed: June 3, 1971

[21] Appl. No.: 149,509

[52] U.S. Cl............................. 156/417, 156/128 I
[51] Int. Cl...................... B29h 17/14, B29k 17/16
[58] Field of Search.................. 157/141, 142, 146; 156/414, 417, 420

[56] References Cited
UNITED STATES PATENTS

| | | | |
|---|---|---|---|
| 1,479,005 | 1/1924 | Pearson | 156/417 X |
| 2,996,108 | 8/1961 | Beeber | 156/417 X |
| 2,980,160 | 4/1961 | Deibel | 156/415 |
| 3,140,216 | 7/1964 | Shilts et al. | 156/415 X |
| 3,644,162 | 2/1972 | Appleby et al. | 156/415 |
| 3,654,025 | 4/1972 | Winzer et al. | 156/415 |
| 2,655,977 | 10/1953 | Hodgkins | 156/420 |
| 3,374,138 | 3/1968 | Porter et al. | 156/417 X |
| 1,577,664 | 3/1926 | Tew | 156/414 X |
| 1,877,746 | 9/1932 | Heston et al. | 156/420 |
| 1,926,345 | 9/1933 | Miller | 156/420 |
| 3,018,518 | 1/1962 | Jefferys | 156/417 X |

FOREIGN PATENTS OR APPLICATIONS 1,194,270  6/1970  Great Britain .................. 156/414

*Primary Examiner*—Alfred L. Leavitt
*Assistant Examiner*—C. B. Cosby
*Attorney*—Mack D. Cook, II

[57] ABSTRACT

Building drum for tires, bands or laminate structures. Drum is driven by a rotary power shaft. Each segment for forming the building surface is post mounted for radial movement and carries cam followers engaging cam channels mounted coaxially of a hub connecting the drum to the power shaft. The segments are expanded by and collapsed by relative motion of the hub and the power shaft.

2 Claims, 4 Drawing Figures

INVENTORS
HERB R. LOHR
TOBY MAGOS JR.

INVENTORS
HERB R. LOHR
TOBY MAGOS JR.

BUILDING DRUM

BACKGROUND OF THE INVENTION

The present invention relates to a collapsible drum for the building of tires, bands or laminate structures. The field of art to which the invention pertains is illustrated by U. S. Pat. No. 2,980,160.

Collapsible building drums according to the prior art comprise a plurality of peripheral segments for mounting around the rotary power shaft of a tire building machine to expand to form a continuous building surface and to collapse to reduce the drum diameter for removal of the tire or bands or components therefrom.

Heretofore, various mechanisms have been designed to expand and collapse the peripheral segments. Such mechanisms have not functioned so that expansion and collapse of the segments will occur in a gradual and controlled manner. Further, the prior art mechanisms have been subject to undue or excessive wear requiring extensive maintenance.

A further disadvantage of the prior art mechanisms has been that during expansion and collapse of the segments the building surface would be distorted so as not to consistently maintain the dimensional accuracy required for the precision building of uniform tires, bands or laminate structures.

SUMMARY OF THE INVENTION

The object of the invention is to provide an improved building drum wherein the peripheral segments will be expanded and collapsed by turning forces applied relative to the power shaft of a tire building machine.

A further object of the invention is to provide a building drum which may be dynamically actuated whereby the inertial and centrifugal forces generated during and by stopping and starting of the power shaft of a tire building machine will collapse and expand the segments which form the building surface.

A still further object is to provide a building drum whereby expansion and collapse of the segments occurs in a gradual and controlled manner so that the mechanism is not subject to undue or excessive wear.

A still further object is to provide a mechanism for a collapsible building drum with a capability of maintaining the dimensional accuracy required for the precision building of uniform tires, bands or laminate structures.

These and other objects of the invention, and the advantages thereof, will be apparent in view of the Description of the Preferred Embodiment as set forth below.

In general, a building drum according to the invention has a plurality of peripheral segments for mounting around the rotary power shaft of a tire building machine to expand to form a continuous, concentric and dimensionally precise building surface and to collapse to reduce the drum diameter for removal of the tire band or annular component. The drum has a hub or axial sleeve adapted for mounting on the power shaft.

A building drum according to the invention is characterized in that each segment is slidably mounted for radial movement relative to the rotational axis of the power shaft on guide posts projecting outwardly from the attachment hub. Each segment also has actuator flanges projecting inwardly toward the hub. The hub coaxially carries radially directed plate means having a plurality of skewed curvilinear cam channels thereon. A cam follower means is carried by each actuator flange and engaged within each cam channel whereby upon relative motion of the power shaft and the hub the segments will expand and collapse.

DESCRIPTION OF THE PREFERRED EMBODIMENT

Figure 1:
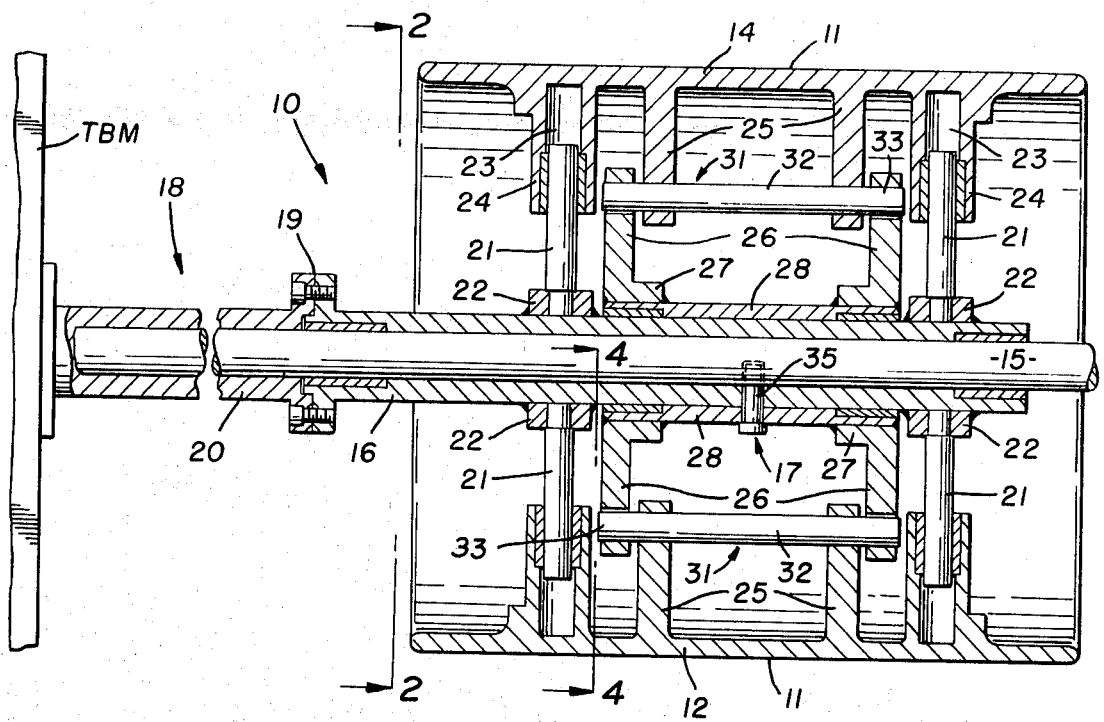
FIG. 1 is a plan view in section of a building drum according to the invention cantilever mounted on the power shaft of a conventional tire building machine.

A drum according to the invention is indicated generally by the numeral 10 and has a continuous, concentric and dimensionally precise building surface 11. The building surface 11 is formed by the radial movement or expansion of a plurality of interfitting and alternating long and short peripheral segments 12 and 14. As is conventional, each peripheral segment 12 and 14 may carry cover or shell plates (not shown) attached in a suitable manner to further define the building surface. The exact dimensional configurations of the shell plates are determined by the design requirements of the tire, band or laminate structure to be built on the drum 10. As shown, there are a series of six peripheral segments 12 and 14 for a conventional tire building machine (TBM).

The rotational axis of the segments 12 and 14 is a power shaft 15 of a conventional tire building machine (TBM). The power shaft 15 extends coaxially through a hub or axial sleeve 16 which is the primary axial component of a building drum 10. The hub 16 is connected to the power shaft 15 through a drive means referred to generally by the numeral 17. The drive means 17 applies a turning force to the hub 16 but also permits a limited relative motion of the power shaft 15 and the hub 16 which is connected to a brake means referred to generally by the numeral 18. As shown, the braking connection for the hub 16 is via a coupling 19 on the hub 16 to a shaft 20 extending from the TBM and coaxially enclosing the power shaft 15. Interiorly of the TBM, the shaft 20 may be selectively engaged by conventional braking elements to at least momentarily interrupt or arrest rotation of the hub 16 with the power shaft 15.

As shown, each of the six segments 12 and 14, are alternately mounted radially of the power shaft 15 on a pair of guide posts 21. The base or inner end of each guide post 21 is carried by an annular collar 22. Each of the two collars 22 is mounted around and secured to the hub 16. The outer or segment mounting end of each guide post 21 is slidably received within a bore 23 in a boss 24 on the inner side of each segment. Each of the segments also has a pair of actuator flanges 25 between the bosses 24 and projecting radially inwardly toward the hub 16.

For the six segments 12 and 14 there are a pair of annular plate means 26 for cooperative association with the segment actuator flanges 25. Each plate means 26 projects radially outwardly of the hub 16 in overlapping relation with an adjacent actuator flange 25. Referring to FIG. 1, each of the two plate means 26 may comprise a radially directed element having a flange 27 securely attached to a common base element 28 rotatably mounted around the hub 16.

Figure 2:
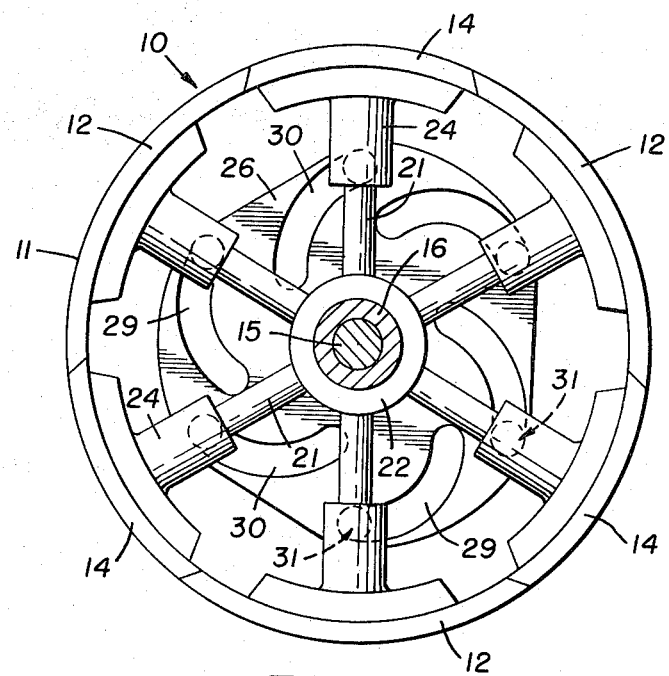
FIG. 2 is an end view of a building drum according to the invention in the expanded condition taken substantially as indicated on line 2—2 of FIG. 1.
Figure 3:
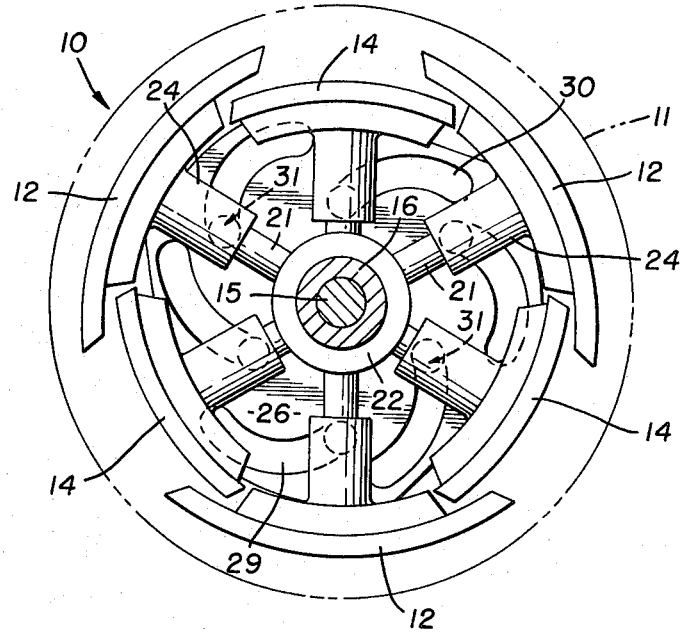
FIG. 3 is an end view of a building drum according to the invention in the collapsed condition.

Referring to FIGS. 2 and 3, each of the two plate means 26 has six cam channels. Three cam channels 29 are for guiding movement of the long segments 12. Three cam channels 30 are for guiding movement of the short segments 14. Each of the channels 29 and 30 begins at a point adjacent or near to the rotational axis of the power shaft 15. Each of the channels continues outwardly away from the rotational axis to terminate near the outer edge of a plate means 26. Upon relative motion of the power shaft 15 and the hub 16, each of the channels functions as a variable pitch scroll cam having a generally spiral or skewed curvilinear orientation.

As shown in FIG. 3, the short segments 14 collapse inwardly of the long segments 12. Accordingly, the cam channels 30 for guiding movement of the short segments have a pitch or degree of inclination or slope, relative to the rotational axis of the power shaft 15, which is greater than the pitch or degree of inclination or slope of the cam channels 29 for guiding movement of the long segments. That is, the channels 30 have a lesser degree of curvature relative to the rotational axis of the power shaft 15 than the channels 29.

As best shown in FIG. 1, the actuator flanges 25 of each of the six segments 12 and 14 are interconnected to the plate means 26 on the hub 16 by a cam follower means referred to generally by the numeral 31. Each of the six cam follower means 31 may comprise a shaft 32 carried transversely between the radially inward ends of the actuator flanges 25 and having projecting ends 33 interfitting within the cam channels 29 and 30.

Figure 4:
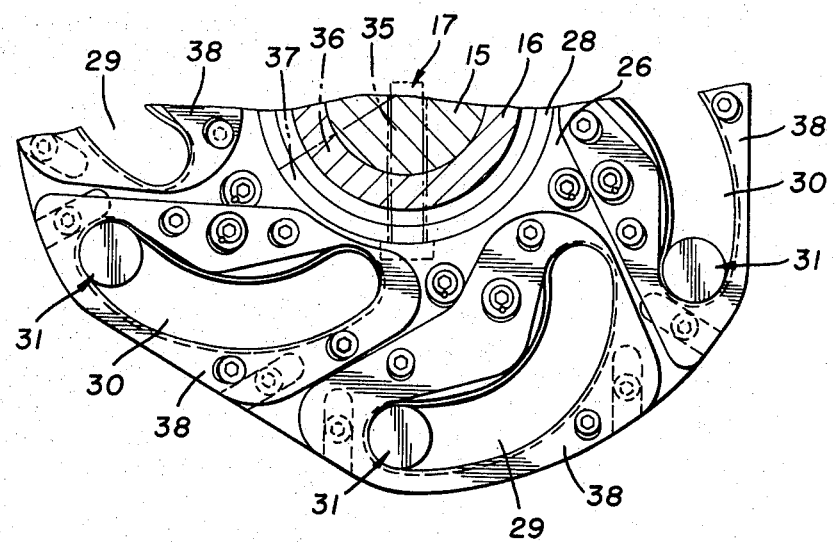
FIG. 4 is a fragmentary view taken substantially as indicated on line 4—4 of FIG. 1.

Referring to FIG. 4, as shown, the drive means 17 for applying a turning force to the hub 16 but also permitting a limited relative motion of the power shaft 15 and the hub 16 may be in the form of a bolt or key 35. The bolt 35 may be inserted into the shaft 15 and movable in an arcuate slot 36 in the hub 16 and a mating slot 37 in the base element 28. The bolt 35 and the slots 36 and 37 are shown in chain lines in FIG. 4. The length of the slots 36 and 37 is such as to permit the cam follower means 31 to fully traverse the cam channels 29 and 30 during expansion and collapse of the peripheral segments 12 and 14.

Still referring to FIG. 4, the cam channels 29 and 30 may be fitted with replaceable and adjustable wear plates 38. The plates 38 may be precisely adjusted using various conventional fastening elements as shown.

What is claimed is:

1. A building drum for a laminate structure comprising a series of alternating long and short peripheral segments for mounting around a rotary power shaft of a building machine and which interfit when expanded to provide a continuous, concentric and dimensionally precise building surface and are collapsed to reduce the drum diameter for removal of the laminate structure, said drum having a hub for mounting on said shaft, each segment being slidably mounted for radial movement relative to the rotational axis of said shaft on guide posts projecting outwardly from the mounting hub and having actuator flanges projecting inwardly toward said hub, characterized in that, said hub is rotated by said power shaft through a drive means and said hub is connected to a brake means to at least momentarily arrest rotation of the hub with the shaft, said drive means permitting a limited relative motion of the shaft to the hub, said hub coaxially carrying the radially directed plate means having a plurality of skewed curvilinear cam channels thereon, said cam channels beginning at a point near to the rotational axis of the power shaft and continuing outwardly to terminate near the outer edge of a plate means, the cam channels guiding said short segments having a pitch relative to the rotational axis of the power shaft which is greater than the pitch of the cam channels guiding movement of said long segments, there being cam follower means carried by each actuator flange and engaged within each cam channel, whereby, upon said relative motion of the power shaft and the hub the segments will expand and collapse.

2. A building drum for a laminate structure comprising a series of alternating long and short peripheral segments for mounting around a rotary power shaft of a building machine and which interfit when expanded to provide a continuous, concentric and dimensionally precise building surface and are collapsed to reduce the drum diameter for removal of the laminate structure, said drum having a hub for mounting on said shaft, each segment being slidably mounted for radial movement relative to the rotational axis of said shaft on guide posts projecting outwardly from the mounting hub and having actuator flanges projecting inwardly toward said hub, characterized in that, said hub is rotated by said power shaft through a drive means and said hub is connected to a brake means to at least momentarily arrest rotation of the hub with the shaft, said drive means permitting a limited relative motion of the shaft to the hub, said hub coaxially carrying radially directed plate means having a plurality of skewed curvilinear cam channels thereon, said cam channels beginning at a point near to the rotational axis of the power shaft and continuing outwardly to terminate near the outer edge of a plate means, the cam channels guiding said short segments having a lesser degree of curvature relative to the rotational axis of the power shaft than the cam channels guiding movement of long segments, there being cam follower means carried by each actuator flange and engaged within each cam channel, whereby, upon said relative motion of the power shaft and the hub the segments will expand and collapse.

* * * * *